(12) United States Patent
Reial et al.

(10) Patent No.: US 7,751,511 B2
(45) Date of Patent: Jul. 6, 2010

(54) METHOD AND APPARATUS FOR SELECTING A SUBSET OF MODELED IMPAIRMENT CORRELATION TERMS FOR USE IN RECEIVED SIGNAL PROCESSING

(75) Inventors: Andres Reial, Lund (SE); Karin Engdahl, Stafaanstorp (SE); Bo Göransson, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 930 days.

(21) Appl. No.: 11/550,901

(22) Filed: Oct. 19, 2006

(65) Prior Publication Data
US 2008/0095279 A1 Apr. 24, 2008

(51) Int. Cl.
- H03D 1/04 (2006.01)
- H03D 1/06 (2006.01)
- H03K 5/01 (2006.01)
- H03K 6/04 (2006.01)
- H04B 1/10 (2006.01)
- H04L 1/00 (2006.01)
- H04L 25/08 (2006.01)

(52) U.S. Cl. ............... 375/346; 375/343; 375/340; 375/349; 375/148; 375/144; 455/63.1; 455/501; 455/65

(58) Field of Classification Search ............ 375/343, 375/340, 346, 349, 350, 148, 144; 455/63.1, 455/501, 65
See application file for complete search history.

(56) References Cited

U.S. PATENT DOCUMENTS 6,363,104 B1  3/2002 Bottomley
6,714,585 B1  3/2004 Wang et al.
7,039,136 B2  5/2006 Olson et al.
2004/0042532 A1  3/2004 Artamo et al.

(Continued)

FOREIGN PATENT DOCUMENTS

WO    2005/096517    10/2005

OTHER PUBLICATIONS

Carins et al., "Low Complexity Parameter Estimation for the Generalized Rake Receiver," 2004 IEEE 11th Digital Signal Processing Workshop & IEEE Signal Processing Education Workshop, Aug. 1, 2004, pp. 191-195, Piscataway, NJ, XP-10806726.

Messier, Geoffrey G., "A Coloured Gaussian Model for CDMA Forward Link In-Cell Interference." In Proceedings of the 2003 IEEE 57th Vehicular Technology Conference Spring (VTC 2003-Spring), Apr. 2003, pp. 2052-2056, vol. 3, Jeju, Korea.

(Continued)

*Primary Examiner*—Phuong Phu
(74) *Attorney, Agent, or Firm*—Coats & Bennett, P.L.L.C.

(57) ABSTRACT

A subset of modeled impairment correlation terms are selected for use in received signal processing. According to one embodiment, a subset of modeled impairment correlation terms is selected and a composite impairment correlation term is determined based on the subset of modeled impairment correlation terms. The composite impairment correlation term may be determined by scaling the modeled impairment correlation terms included in the subset by respective model fitting parameters. The scaled modeled impairment correlation terms are then combined to form the composite impairment correlation term. The subset of modeled impairment correlation terms may be selected based on their respective model fitting parameters. In one embodiment, the modeled impairment terms having a model fitting parameter that satisfy a threshold are included in the subset while those that do not are excluded. The composite impairment correlation term may be used for received signal processing, e.g., demodulation or signal-to-interference estimation.

40 Claims, 4 Drawing Sheets

U.S. PATENT DOCUMENTS

| | | |
|---|---|---|
| 2005/0152486 A1 | 7/2005 | Wang |
| 2005/0157776 A1 | 7/2005 | Ryu |
| 2005/0201447 A1 | 9/2005 | Cairns et al. |
| 2005/0215218 A1* | 9/2005 | Bottomley et al. ....... 455/226.1 |
| 2006/0007990 A1 | 1/2006 | Cozzo et al. |

OTHER PUBLICATIONS

Fulghum et al., "Low Complexity Parameter Estimation for the Multi-antenna Generalized RAKE Receiver," IEEE Vehicular Technology Conference XX, 2006, pp. 1874-1878, XP002430340.

* cited by examiner

METHOD AND APPARATUS FOR SELECTING A SUBSET OF MODELED IMPAIRMENT CORRELATION TERMS FOR USE IN RECEIVED SIGNAL PROCESSING

BACKGROUND

The present invention generally relates to wireless communication devices, and particularly relates to selecting a subset of modeled impairment correlation terms for use in determining a composite impairment correlation term.

Signals transmitted in a wireless communication system such as Code Division Multiple Access (CDMA) or Wideband CDMA (WCDMA) systems are subjected to multiple sources of interference and noise as they propagate via radio channels. The various sources of interference and noise that affect signal transmission and reception in a wireless communication system are broadly referred to as impairments. For example, in dispersive environments, signals may become impaired due to multi-path fading, where reflections cause several instances of the same transmitted signal to arrive at a receiver at different points in time. Other sources of signal impairments include own-cell and other-cell interference, where the term 'cell' refers to a geographic area of radio coverage served by a particular cell site (e.g., a radio tower and corresponding equipment such as a base station). Own-cell interference arises primarily due to multi-path propagation, since spreading code orthogonality is lost due to inter-symbol interference, multi-user interference, or both. Other-cell interference arises mainly due to the use of different scrambling codes assigned to different users in adjacent cells. The different scrambling codes cause energy received from a neighboring cell to act as interference in one's own cell, the interference being colored for multipath fading channels.

Various other signal impairment sources may also be present. For example, in multi-antenna systems such as Multiple-Input Multiple-Output (MIMO) systems, additional users may be simultaneously served via assigned substreams. However, each substream yields a different interference pattern. In addition, each user's substream may be pre-coded to match its channel realization, e.g., by using a precoding vector acquired from a codebook of such vectors. Each preceding vector applied at a transmitter gives rise to a distinct interference pattern.

In some multi-antenna systems, transmit diversity is used to achieve high data rates by transmitting the same signal stream via multiple transmit antennas. Transmit diversity methods conventionally fall into two categories: open and closed loop. Space-Time Transmit Diversity (STTD) is an example of an open loop technique where a signal stream is space-time coded over two symbol streams and transmitted via two antennas simultaneously. This results in a signal impairment pattern that is different from that caused by single-antenna transmission.

For closed loop transmit diversity, such as Transmit Adaptive Array (TXAA), a receiver measures relative phase and power of multiple pilot channels, e.g., CPICH common pilot signals. The measured information is fed back to the corresponding base station. The base station adjusts its signal transmission characteristics based on this information in order to maximize received power at the receiver. A number of distinct transmit patterns may be used by a closed loop transmitter, e.g., one pattern per assigned user. Each of these different patterns will also be a distinct source of signal impairment.

Unknown or un-modeled signal impairments are conventionally treated as white noise. Also, certain types of impairments may be correlated. That is, two impairment signals may in fact be related, and thus are said to be correlated. Some conventional receivers such as Generalized-RAKE (G-RAKE) receivers and Chip Equalizers (CEQs) make use of these impairment correlations to improve received signal processing.

A G-RAKE receiver includes various 'fingers', each finger having an assigned path delay for receiving a particular image of a multipath signal and a correlator for despreading the received image. In combination, the fingers despread multiple signal images of a received multipath signal, thus mitigating the effect of the multipath channel fading phenomenon. Some G-RAKE fingers may be placed on signal path delays for receiving images of a multipath signal while other fingers may be placed off path delays for capturing impairment correlation information associated with the various fingers. The finger outputs are weighted and coherently combined to improve received signal demodulation and/or signal-to-interference estimation. The weights assigned to the finger outputs are conventionally a function of the channel characteristics and impairment correlations. As such, knowledge of signal impairments may be used to improve received signal processing. In a similar manner, CEQs utilize impairment correlations for improving received signal processing where the placement of filter taps in a CEQ is comparable to the placement of fingers in a G-RAKE.

According to one conventional approach, the dominant interference-based impairment correlation term is modeled and expressed as one impairment correlation matrix while the remaining interferers and noise-related impairments are lumped into a second impairment correlation matrix. These component impairment correlation matrices are then subjected to a model fitting process, e.g., a least-squares process to determine corresponding model fitting parameters. The model fitting parameters determine the weight or contribution the noise and interference-based impairment correlation terms have on the corresponding composite matrix.

According to another conventional approach, an impairment correlation term is modeled separately for each impairment source of interest. As such, multiple noise and interference-based impairment correlation terms are generated. All of the various impairment correlation terms are then combined to form a composite impairment correlation matrix, e.g., using a least-squares process. As with the conventional 'lumping' approach, calculated model fitting parameters correspond to the weight or contribution each impairment correlation term has on the composite matrix.

SUMMARY

According to the methods and apparatus taught herein, various sources of impairment in a wireless communication environment are analyzed to form a set of modeled impairment correlation terms. The modeled impairment correlation terms are used to determine a composite impairment correlation term based on a model fitting parameter process such as least-squares. According to the model fitting process, a model fitting parameter is calculated for each modeled impairment correlation term where, the model fitting parameters indicate the weight or contribution each of the impairment terms has on the composite impairment correlation term.

In some situations, it may be desirable to exclude some impairment correlation terms from the model fitting process. For example, as the number of terms included in the model fitting process increases, the results become less reliable given the same amount of available data. That is, as the number of model fitting parameters to be estimated increases, the reliability of the estimation process decreases given the same amount of data (e.g., pilot channel data). As such, impairment correlation terms providing a less-than-desired contribution to the composite impairment correlation term may be excluded from the model fitting process in order to improve the accuracy of those terms included in the process. In addition, the model fitting process may yield non-zero model fitting parameters for impairment sources that are inactive. As a result, their corresponding impairment correlation terms still erroneously affect the composite impairment correlation matrix unless excluded from the model fitting process.

According to one embodiment of determining a composite impairment correlation term, a subset of modeled impairment correlation terms is selected from a set of such terms. The composite impairment correlation term is determined based on the subset of modeled impairment correlation terms. The composite impairment correlation term may be determined by scaling the modeled impairment correlation terms included in the subset by respective model fitting parameters. The scaled, modeled impairment correlation terms are then combined to form the composite impairment correlation term.

In one embodiment, the subset of modeled impairment correlation terms is selected based on the model fitting parameters. Modeled impairment terms having a model fitting parameter that satisfies a threshold are included in the subset while those that do not are excluded. All model fitting parameters may be compared to the same threshold. Alternatively, groups of one or more of the model fitting parameters may be compared to individualized thresholds. Regardless, the composite impairment correlation term may be used for received signal processing, e.g., demodulation or signal-to-interference estimation.

Of course, the present invention is not limited to the above features and advantages. Those skilled in the art will recognize additional features and advantages upon reading the following detailed description, and upon viewing the accompanying drawings.

DETAILED DESCRIPTION

Figure 1:
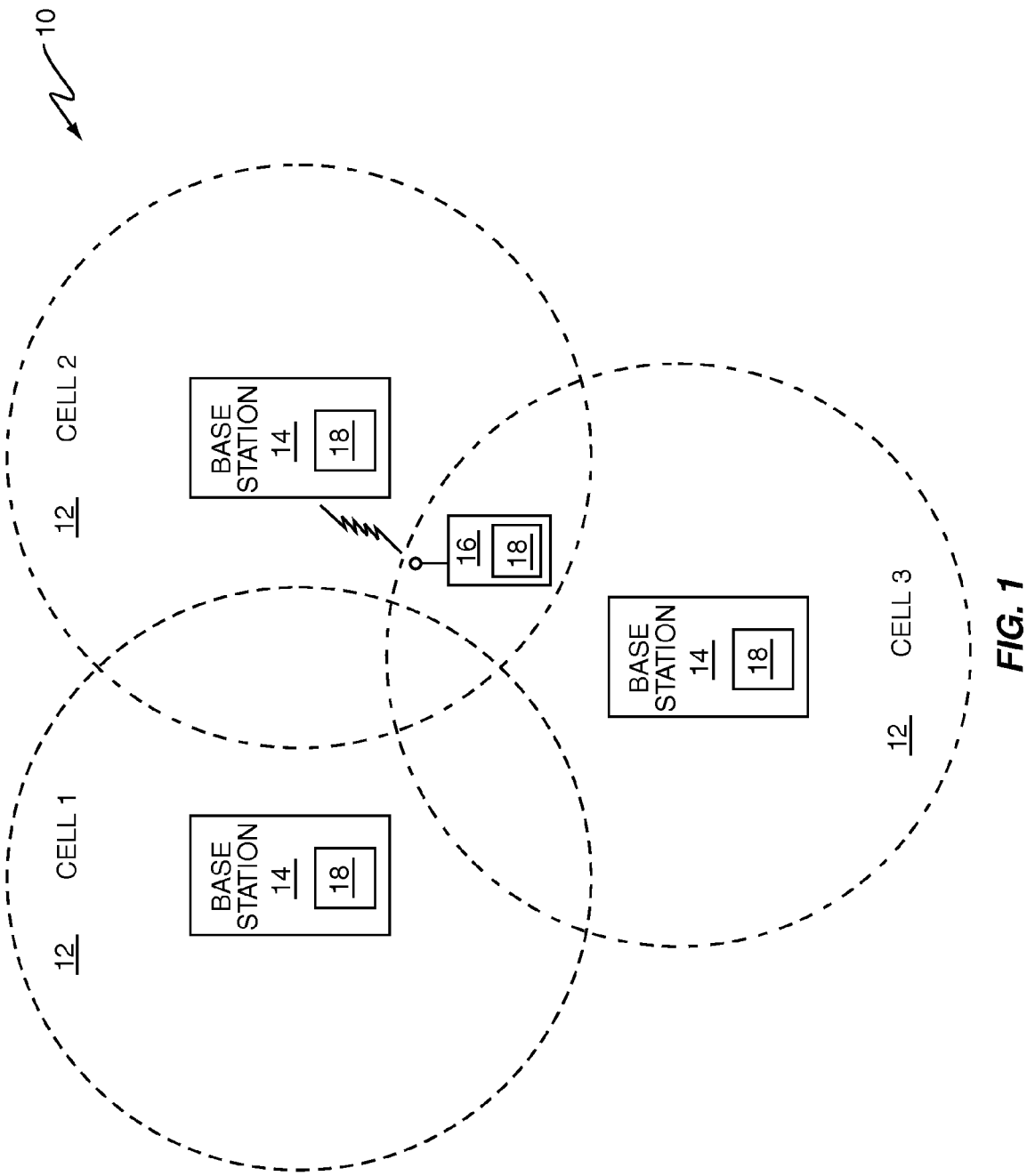
FIG. 1 is a block diagram of one embodiment of a wireless communication system having components that select a subset of modeled impairment terms for use in received signal processing.

FIG. 1 partially illustrates an embodiment of a wireless communication network 10 having multiple exemplary cells 12 (CELL1, CELL2, and CELL3) for providing wireless communication services. To that end, each cell 12 has a corresponding base station 14 that services a particular geographic area of radio coverage. One or more in-range mobile devices 16 communicate with the base stations 14, e.g., via Code Division Multiple Access (CDMA) or Wideband CDMA (WCDMA). For example, as shown in FIG. 1, the base station 14 serving the second cell 12 (CELL2) communicates with an exemplary mobile device 16, e.g., a mobile phone or cell phone. In general, signals propagating between the base stations 14 and mobile devices 16 may be subjected to various kinds of impairments, e.g., own-cell interference, other-cell interference, multi-user interference, thermal noise, etc. As used herein, the term 'impairment' broadly refers to one or more of interference and noise in the context of wireless communication.

With this in mind, a wireless communication apparatus 18 included in one or more of the base stations 14 and/or mobile devices 16 models various impairment sources, e.g., by using channel coefficients, path delays and corresponding pulse shape autocorrelation functions to develop impairment correlation models. By modeling various suspected sources of impairment, the wireless communication apparatus 18 gains knowledge of the multipath fading channel from which it receives signals. This knowledge may then be used to improve processing of received signals.

Modeling of an impairment source conventionally yields an impairment correlation term associated with that source. An impairment correlation term may be represented as a matrix having diagonal elements that indicate the impairment-power contribution of the corresponding impairment source and off-diagonal elements that indicate the degree of cross-correlations between different Generalized-RAKE (G-RAKE) fingers or Chip Equalizer (CEQ) taps. For additional background regarding exemplary impairment correlation matrix formulation, refer to issued U.S. Pat. No. 6,714,585 and co-pending U.S. Published Patent Application No. 2005/0201447, both of which are assigned to the assignee hereof and incorporated herein by reference in their entirety.

Regardless as to how various impairment correlation terms are formed, the wireless communication apparatus 18 selects a desired subset of them for use in generating a composite impairment correlation term via a model fitting process. The wireless communication apparatus 18 then uses the composite impairment correlation term for received signal processing. By eliminating undesired impairment terms from the model fitting process, the resulting composite impairment correlation term has improved reliability given a limited amount of available data, e.g., data obtained from a pilot channel such as a common pilot channel (e.g., CPICH). In addition, if one or more of the eliminated impairment terms correspond to inactive or inconsequential impairment sources, they no longer have an effect on the resulting composite impairment correlation term. As a result, a more accurate and reliable composite impairment correlation term is produced for use in received signal processing.

Figure 2:
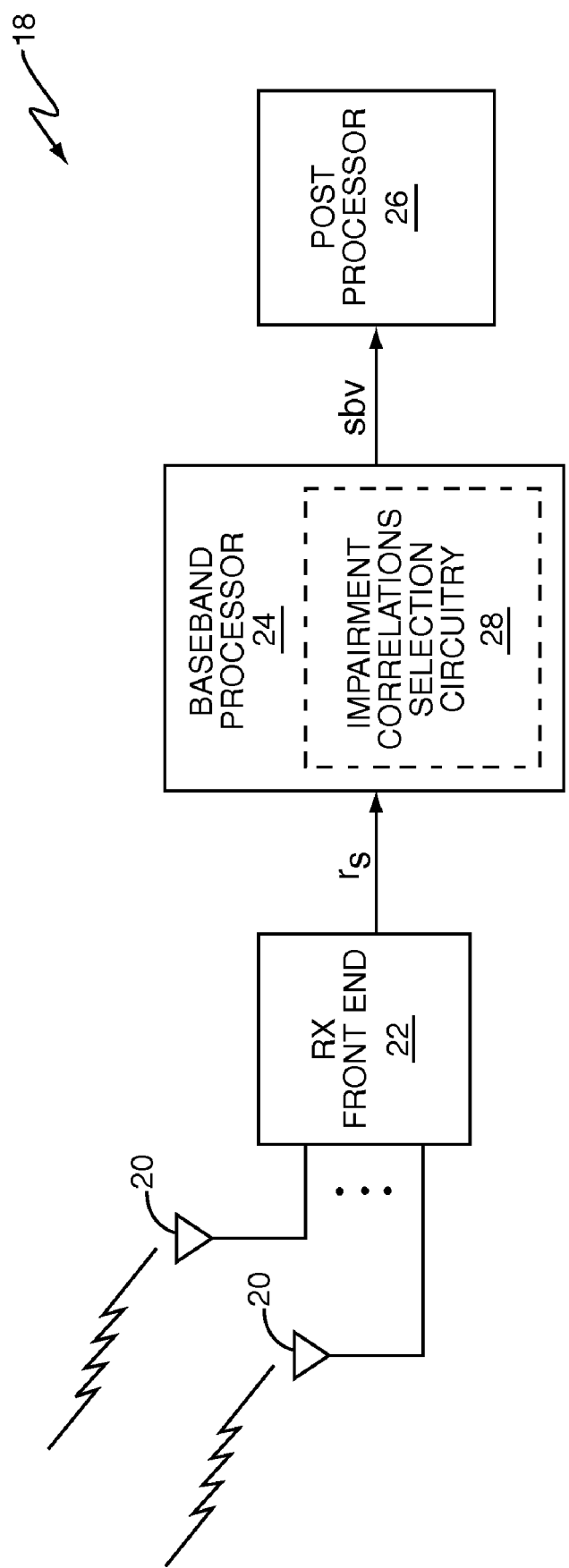
FIG. 2 is a block diagram of one embodiment of a wireless communication apparatus that selects a subset of modeled impairment terms for use in received signal processing.

FIG. 2 illustrates one embodiment of the wireless communication apparatus 18 where the apparatus 18 includes one or more antennas 20, front end circuitry 22, a baseband processor 24 and a post processor 26. The antenna(s) 20 receive signal energy transmitted from an own-cell base station 14 and possibly from one or more other base stations 14 serving adjacent cells 12. For example, the mobile device 16 serviced by the second cell (CELL2) in FIG. 1 is also within range of the base station 14 serving the third cell (CELL3) and thus may receive signal energy from both cells. The front end circuitry 22 filters and down-converts received signals to produce corresponding baseband signals ($r_s$). The baseband processor 24, e.g. a G-RAKE receiver or chip equalizer, produces soft bit values (sbv) or symbol estimates based on the baseband signals. The post processor 26 performs other signal processing operations on the soft bit values, e.g., error correction decoding.

Signal energy received by the wireless communication apparatus 18 may include various impairment components that adversely affect the apparatus's ability to adequately recover a desired signal from the received energy and should be suppressed to improve performance. The suppression is most effective if the composite covariance term used in the process closely corresponds to the actual interference experienced by the receiver. With this in mind, the baseband processor 24 comprises selection circuitry 28, which may include software, configured to select a desired subset of modeled impairment correlation terms from a candidate set for use in determining a composite impairment correlation term. As such, only the terms selected for inclusion in the subset will contribute to the composite impairment correlation term.

Figure 3:
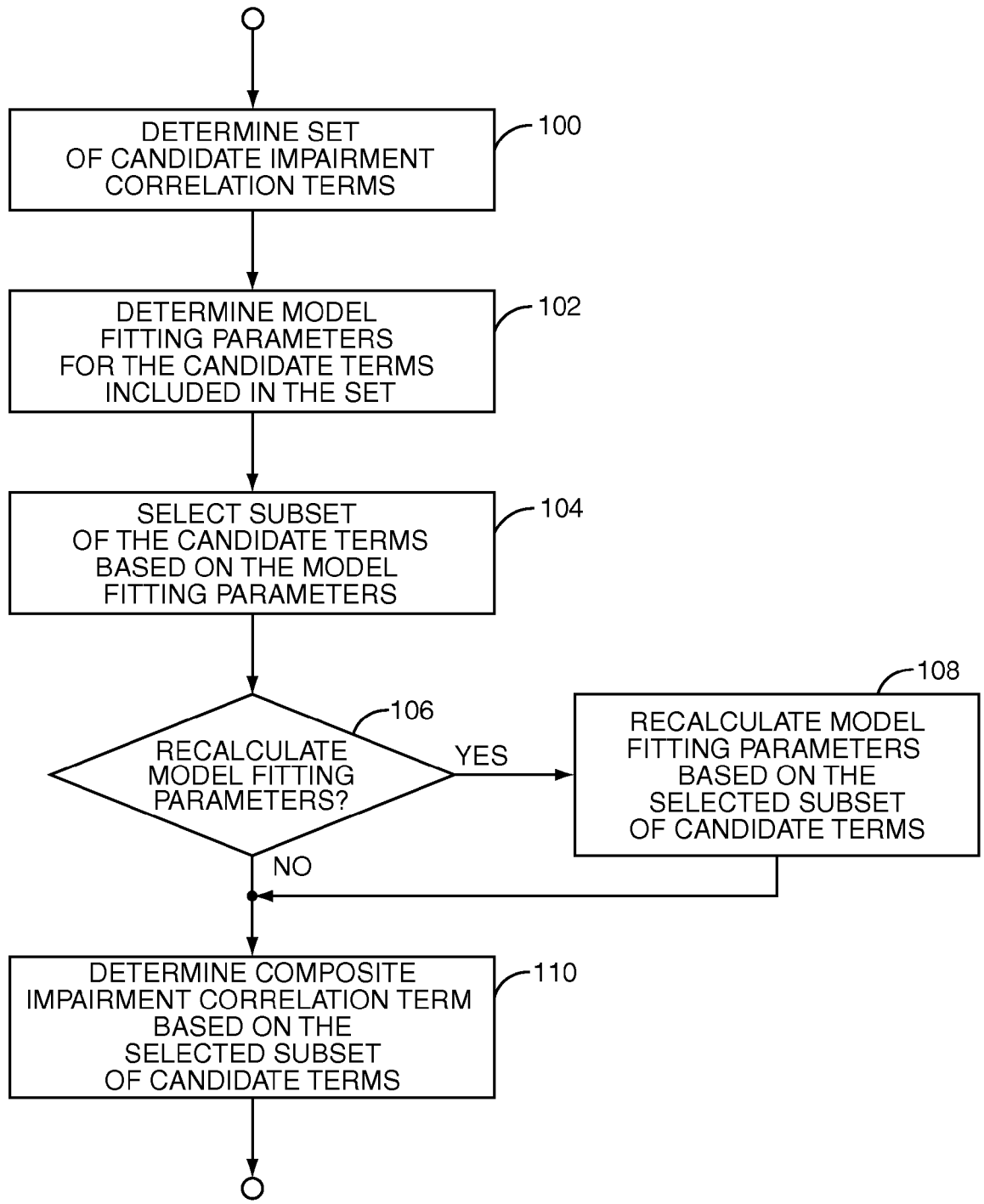
FIG. 3 illustrates one embodiment of processing logic for selecting a subset of modeled impairment terms for use in received signal processing.

FIG. 3 illustrates an embodiment of program logic for selecting a subset of modeled impairment correlation terms from a candidate set. The program logic 'begins' with the baseband processor 24 determining a set of modeled impairment correlation matrices $R_n^i$, i ∈I, where I is the set of all modeled impairment correlations for a measurement period n (Step 100). The baseband processor 24 also determines an instantaneous true impairment correlation matrix $\hat{R}$, e.g., from pilot symbols, training data, or other signal information known a priori to the wireless communication apparatus 18 such that the reception of the known signal information can be used to characterize the signal propagation channels. The instantaneous true impairment correlation matrix represents the net effect of all impairment sources on a known received signal such as a pilot signal.

Next, the baseband processor 24 implements a model fitting process for determining fitting parameters for each of the modeled impairment correlation terms included in the set, e.g., a least-squares process (Step 102). During the model fitting process, impairment correlation matrices are scaled by model fitting parameters $w_n^k$ such that their scaled sum equates approximately to the instantaneous true impairment correlations matrix $\hat{R}$ as given by:

$$\hat{R} \approx \sum_{k \in I} w_n^k R_n^k \qquad (1)$$

where $w_n^k$ is the model fitting parameter associated with the $k^{th}$ matrix included in the set I. The model fitting parameters indicate the weight or contribution each impairment correlation matrix has on the instantaneous true impairment correlation matrix. In one embodiment of a least-squares fitting process, the model fitting parameters are given by:

$$w_n = (A^H A)^{-1} A^H p \qquad (2)$$

where the column vector p is formed by stacking the instantaneous true impairment correlation matrix $\hat{R}$ column-wise and the i-th column of A is formed by stacking the modeled impairment correlation matrix $R_n^i$ column-wise.

The model fitting parameters may be filtered by the baseband processor 24 to reduce estimation variance associated with the impairment correlation modeling process. Depending on the rate of variation, filtering may occur over long or short intervals. For example, in a WCDMA environment, long term filtering over several WCDMA frames may be applied if one or more adjacent cells impair signal transmission since the relative signal strengths of the adjacent cells change slowly. In one embodiment, long term filtering via exponential smoothing is given by:

$$\overline{w}_n^i = \lambda \overline{w}_{n-1}^i + (1-\lambda) w_n^i \qquad (3)$$

where λ determines the time constant of the long term filtering process. Alternatively, an exemplary short term filtering process over 3 slots, corresponding to one High Speed Downlink Packet Access (HSDPA) Transmission Time Interval (TTI), is given by:

$$\overline{w}_n^j = \frac{1}{3} \sum_{n=k \bmod 3}^{(k \bmod 3)+2} w_n^j \qquad (4)$$

Regardless, as part of the model fitting process or prior to it, the modeled impairment correlation terms included in the original set are normalized to facilitate the impairment term selection process. The modeled impairment terms are normalized so that the selection circuitry 28 is able to fairly and accurately determine which terms are to be selected and which ones are not. In one embodiment, the impairment correlation terms included in the original set are normalized as a function of impairment-power contribution as given by:

$$R_n^i = \frac{R_n^i}{\text{trace}[R_n^i]} \qquad (5)$$

where the trace of the corresponding modeled matrix $R_n^i$ provides a sum of the main diagonal elements. For a particular impairment correlation matrix, the sum of its main diagonal elements represents its impairment-power contribution. Normalizing the modeled impairment correlation terms using the matrix trace operation of eq. 5 allows the selection circuitry 28 to determine which impairment terms in the set should be selected based on impairment-power contribution. This is because the weight $\overline{w}_n^i$ will be proportional to the interference power contribution from source i. Those skilled in the art will readily recognize that other normalization procedures may be employed, e.g., by accounting for the extent of off-diagonal contribution from a given matrix, where the off-diagonal contribution represents the amount of correlation present in each interference source.

After normalization and model fitting parameter determination, the selection circuitry 18 selects a desired subset of impairment correlation terms from the original set for use in determining a composite impairment correlation term (Step 104). In one embodiment, the N largest model fitting parameters are selected for inclusion in the subset. As such, the impairment sources having a desired largest effect on a received signal are selected for inclusion in the subset. Impairment sources having a less than desired contribution are thus eliminated from consideration.

According to another embodiment, the original set of model fitting parameters is compared to some threshold criteria. The modeled impairment terms having a model fitting parameter that satisfies the threshold criteria are included in the subset. The other modeled impairment terms are excluded. Optionally, not all model fitting parameters that satisfy the threshold criteria are included in the subset. For example, certain restrictions such as hardware limitations, processing power restrictions, etc., may limit the total number of parameters that can be included in the subset. Accordingly, only the M largest parameters are included in the subset even if more than M parameters satisfy the threshold criteria. The parameters that satisfy the threshold, but are not among the M largest, are thus excluded from the subset.

The threshold criteria may be common to all of the model fitting parameters. That is, all model fitting parameters are compared to the same value. Only the modeled impairment terms having a model fitting parameter exceeding the common threshold are included in the subset as given by:

$$I_{sub} = \{i | i \in I, \overline{w}^i > \tau\} \quad (6)$$

where $\tau$ is the common threshold value and $I_{sub}$ is the subset of selected modeled impairment correlation terms. A common threshold may be used if all modeled interference sources contribute the same type of interfering signal. This would be the case for several neighboring cells, or many potential Transmitter Adaptive Array (TXAA) lobe patterns. The common threshold would also be appropriate if the channel conditions (number of multipath components and the channel SIR) do not differ significantly and the transmitted signal structures (signal powers, traffic modes) are similar.

Alternatively, the threshold criteria may be specific or tailored to groups of one or more of the model fitting parameters. That is, not all of the model fitting parameters are compared to the same value. The modeled impairment terms having a model fitting parameter exceeding its tailored threshold are included in the subset as given by:

$$I_{sub} = \{i | i \in I, \overline{w}^i > \tau^m\} \quad (7)$$

where $\tau^m$ is the tailored threshold value. The index m may equal the model fitting parameter index i (i.e., the threshold is individualized to each parameter) or may be some multiple thereof (i.e., the threshold is common for groups of two or more parameters). Specific thresholds for groups of interference sources may be used if the modeled interference sources within the group contribute the same type of interfering signal, but there may be several such distinct groups, e.g. several other-cell interferers and several potential own-cell TXAA diversity lobe patterns. A tailored threshold would also be appropriate if the different neighboring cells exhibit significantly differing channel conditions and/or transmitted signal structures. In addition, tailored thresholds may be used if the receiver has a priori information about some interference sources appearing with higher probability than others.

In yet another embodiment, the desired subset of impairment correlation terms is selected by first identifying two or more groups of impairment correlation terms, each group comprising at least one impairment correlation term. The threshold is applied to the model fitting parameters of at least one of the groups. All terms included in the group(s) that satisfy the threshold are included in the desired subset. However, only the M largest terms from the other group(s) are included in the subset.

Some situations may call for the inclusion and/or exclusion of particular modeled impairment terms regardless of whether their corresponding model fitting parameters satisfy the threshold criteria. In one embodiment, a modeled term is included in the subset regardless of whether its model fitting parameter satisfies the threshold criteria if its corresponding impairment source is known to be active, e.g., own-cell interference or uncolored input interference. In another embodiment, a modeled impairment term corresponding to a dominant interference source is excluded from the subset if the modeled impairment term corresponding to own-cell interference has a model fitting parameter that fails the threshold. In such a situation, the term corresponding to own-cell interference is included in the subset despite its sub-par model fitting parameter while the term corresponding to the dominant interference source is excluded.

After the subset of desired impairment correlation terms has been selected, the baseband processor 24 determines whether the model fitting parameters associated with the terms included in the subset are to be re-calculated prior to determining the composite impairment correlation term (Step 106). If so, the model fitting parameters associated with the subset of selected impairment correlation terms are re-calculated (Step 108), e.g., by substituting $I_{sub}$ for I in eqs. 1 and 2. Re-calculating the model fitting parameters prior to determining the composite impairment correlation term yields a more accurate composite term. That is, since the model fitting process utilizes a fixed amount of data, reducing the number of parameters to be estimated improves their resulting accuracy. Since fewer model fitting parameters are re-calculated than were initially calculated, the re-calculated model fitting parameters have improved accuracy. As a result, the composite impairment correlation term will also be more accurate when determined.

In one embodiment, modeled impairment covariance terms having similar structures, e.g., several neighboring cells within line of sight are combined into one term. Combining similar covariance terms enhances the re-calculation step 108 in that the number of fitting parameters estimated is reduced, thus improving their quality. Parameter estimation quality is enhanced since the numerical properties of the LS solution (the condition number of the matrix to be inverted) are improved when two or more similar covariance terms are combined into one term. Similar modeled covariance terms may be detected by, e.g., comparing the normalized covariance matrices of all components and identifying those pairs for which the sum of the differences of the matrix elements is below a chosen threshold.

Regardless, the baseband processor 24 determines the composite impairment correlation term based on the subset of selected modeled impairment correlation terms (Step 110). Particularly, the modeled impairment correlation terms included in the subset are scaled by their respective model fitting parameters w (re-calculated or otherwise) and then summed as given by:

$$\tilde{R}_n = \sum_{i \in I_{sub}} w^i R_n^i \quad (8)$$

where $\tilde{R}_n$ is the composite impairment correlation matrix used for received signal processing. In one embodiment, the baseband processor 24 uses the composite impairment correlation matrix to compute processing weights such as G-RAKE combining weights or chip equalizer filter tap weights. In another embodiment, the baseband processor 24 uses the composite matrix to calculate a Signal-to-Interference Ratio (SIR).

Figure 4:
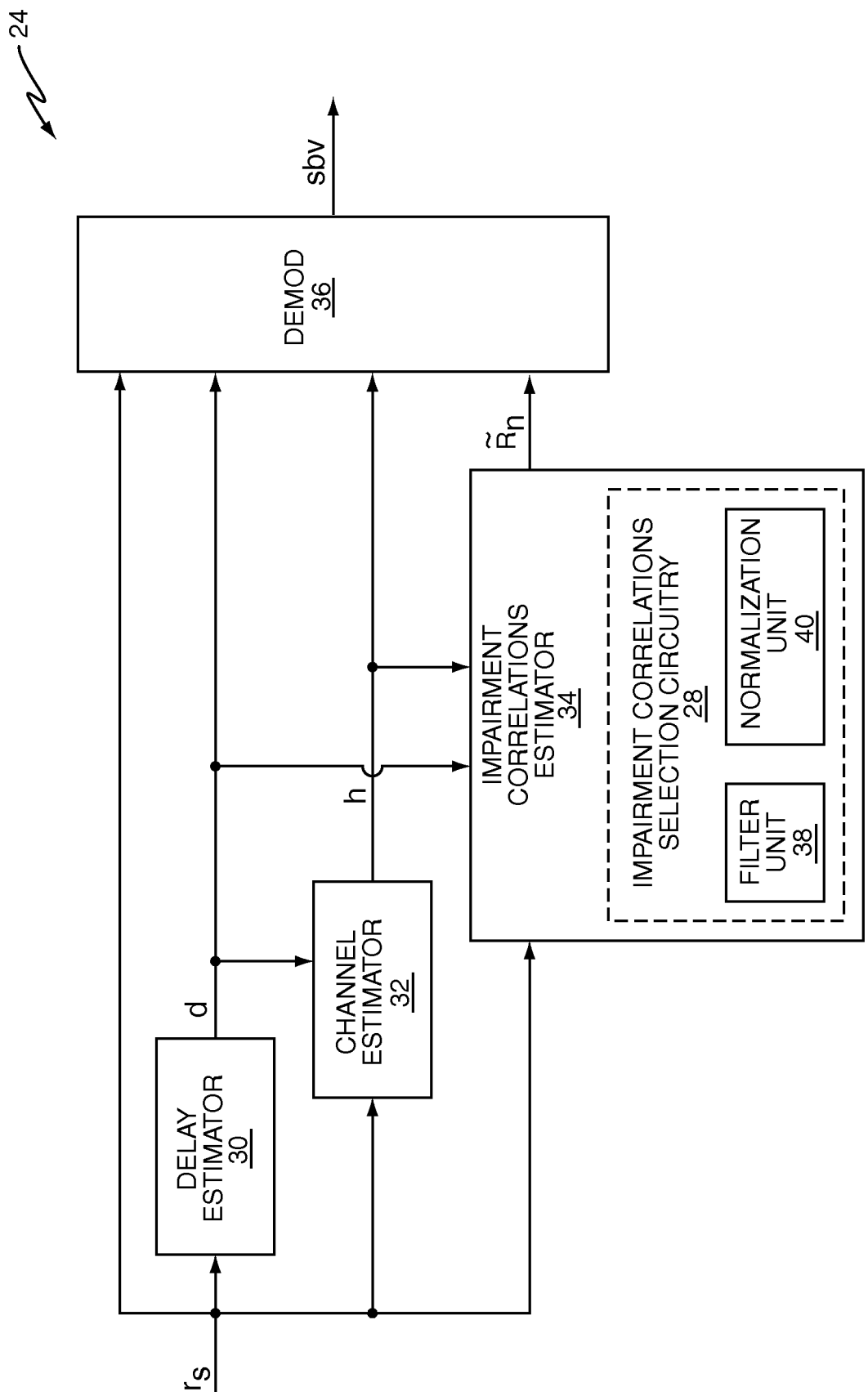
FIG. 4 is a block diagram of one embodiment of a baseband processor that selects a subset of modeled impairment terms for use in received signal processing.

FIG. 4 illustrates one embodiment of the baseband processor 24 including the selection circuitry 28 for selecting a subset of modeled impairment correlation terms. The baseband processor 24 also includes a delay estimator 30, a channel estimator 32, an impairment correlations estimator 34, and a demodulator 36. The delay estimator 30 determines processing delays d associated with the multipath fading channel(s) from which signals are received, e.g., G-RAKE finger delays or chip equalizer filter tap delays. The channel estimator 32 determines channel coefficients h that represent the impulse response of the multipath fading channel(s). Based on the channel coefficients and processing delays, the impairment correlations estimator 34 generates a set of modeled impairment correlation terms $R_n^i$, the set representing various impairment sources that may affect received signal processing.

The selection circuitry 28 selects a subset of the impairment terms modeled by the impairment correlations estimator 34. A filter unit 38 and normalization unit 40 included in or associated with the selection circuitry 28 assists in the subset selection process. Particularly, the filter unit 38 causes the model fitting parameters associated with the modeled impairment terms to be filtered in order to reduce estimation variance as previously described. The normalization unit 40 enables the selection circuitry 28 to fairly and accurately determine which terms are to be selected and which ones are not by causing the modeled impairment terms to be normalized as previously described.

Once selected, the subset of modeled impairment correlation terms is used to determine the composite impairment correlation matrix $\tilde{R}_n$. The composite impairment correlation matrix is provided to the demodulator 36. The demodulator 36 then calculates processing weights z such as G-RAKE combining weights or chip equalizer filter tap weights using the composite impairment correlations matrix $\tilde{R}_n$, the processing delays d, and the channel coefficients h as given by:

$$z = \tilde{R}_n^{-1} h \quad (9)$$

The processing weights are then used for received signal processing, e.g., used to weight G-RAKE finger outputs/CEQ tap filters and/or to calculate SIR.

With the above range of variations and applications in mind, it should be understood that the present invention is not limited by the foregoing description, nor is it limited by the accompanying drawings. Instead, the present invention is limited only by the following claims, and their legal equivalents.

What is claimed is:

1. A method of determining a composite impairment correlation term associated with a received signal from a set of modeled impairment correlation terms at a wireless communication apparatus, comprising:
    selecting a subset of the modeled impairment correlation terms using circuitry included in the wireless communication apparatus by selecting the modeled impairment correlation terms having N largest model fitting parameters, wherein N is a predetermined positive integer; and
    determining the composite impairment correlation term based on the subset of modeled impairment correlation terms using an impairment correlation estimator included in the wireless communication apparatus.

2. The method of claim 1, wherein selecting a subset of the modeled impairment correlation terms comprises selecting the modeled impairment correlation terms having corresponding model fitting parameters that satisfy a threshold.

3. The method of claim 2, wherein the threshold is common to the set of modeled impairment correlation terms.

4. The method of claim 2, wherein the threshold is particular to individual groups of one or more of the modeled impairment correlation terms.

5. The method of claim 2, further comprising including one or more of the modeled impairment correlation terms in the subset regardless of whether their respective model fitting parameters satisfy the threshold.

6. The method of claim 5, wherein the individual ones of the modeled impairment correlation terms included in the subset regardless of whether their respective model fitting parameters satisfy the threshold correspond to one or more known active interference sources.

7. The method of claim 2, further comprising:
    excluding from the subset the modeled impairment correlation term corresponding to a dominant interference source if the model fitting parameter associated with the modeled impairment correlation term corresponding to own-cell interference fails the threshold; and
    including in the subset the modeled impairment correlation term corresponding to own-cell interference.

8. The method of claim 2, further comprising:
    normalizing the modeled impairment correlation terms prior to selecting the subset; and
    determining the model fitting parameters based on the normalized modeled impairment correlation terms.

9. The method of claim 8, wherein normalizing the modeled impairment correlation terms comprises scaling the modeled impairment correlation terms to obtain a unit impairment-power contribution for individual ones of the modeled impairment correlation terms.

10. The method of claim 9, wherein scaling the modeled impairment correlation terms to obtain a unit impairment-power contribution for individual ones of the modeled impairment correlation terms comprises dividing individual ones of the modeled impairment correlation terms by their corresponding trace.

11. The method of claim 2, further comprising filtering the model fitting parameters to reduce estimation variance.

12. The method of claim 1, wherein determining the composite impairment correlation term based on the subset of modeled impairment correlation terms comprises:
    scaling the modeled impairment correlation terms included in the subset by respective model fitting parameters; and
    combining the scaled modeled impairment correlation terms to form the composite impairment correlation term.

13. The method of claim 12, wherein the model fitting parameters are calculated based on the set of modeled impairment correlation terms.

14. The method of claim 13, wherein the model fitting parameters are re-calculated, before the composite impairment correlation term is determined, based on the subset of modeled impairment correlation terms.

15. The method of claim 12, wherein the model fitting parameters are determined in accordance with a least-squares process.

16. The method of claim 1, further comprising forming the set of modeled impairment correlation terms by combining similar modeled impairment covariance terms into respective combined impairment covariance terms.

17. A wireless communication apparatus, comprising:
    an impairment correlation estimator configured to determine a composite impairment correlation term associated with a received signal from a set of modeled impairment correlation terms; and
    circuitry configured to select a subset of the modeled impairment correlation terms by selecting the modeled impairment correlation terms having N largest model fitting parameters, wherein N is a predetermined positive integer and to direct the impairment correlation estimator to determine the composite impairment correlation term based on the subset of modeled impairment correlation terms.

18. The wireless communication apparatus of claim 17, wherein the circuitry is configured to select a subset of the modeled impairment correlation terms by selecting the modeled impairment correlation terms having corresponding model fitting parameters that satisfy a threshold.

19. The wireless communication apparatus of claim 18, wherein the threshold is common to the set of modeled impairment correlation terms.

20. The wireless communication apparatus of claim 18, wherein the threshold is particular to individual groups of one or more of the modeled impairment correlation terms.

21. The wireless communication apparatus of claim 18, wherein the circuitry is further configured to include one or more of the modeled impairment correlation terms in the subset regardless of whether their respective model fitting parameters satisfy the threshold.

22. The wireless communication apparatus of claim 21, wherein the circuitry is configured to include individual ones of the modeled impairment correlation terms in the subset regardless of whether their respective model fitting parameters satisfy the threshold correspond to one or more known active interference sources.

23. The wireless communication apparatus of claim 18, wherein the circuitry is further configured to exclude from the subset the modeled impairment correlation term corresponding to a dominant interference source if the model fitting parameter associated with the modeled impairment correlation term corresponding to own-cell interference fails the threshold and to include in the subset the modeled impairment correlation term corresponding to own-cell interference.

24. The wireless communication apparatus of claim 18, wherein the circuitry is further configured to normalize the modeled impairment correlation terms before the circuitry selects the subset.

25. The wireless communication apparatus of claim 24, wherein the circuitry is configured to normalize the modeled impairment correlation terms by scaling the modeled impairment correlation terms to obtain a unit impairment-power contribution for individual ones of the modeled impairment correlation terms.

26. The wireless communication apparatus of claim 25, wherein the circuitry is configured to scale the modeled impairment correlation terms to obtain a unit impairment-power contribution for individual ones of the modeled impairment correlation terms by dividing individual ones of the modeled impairment correlation terms by their corresponding trace.

27. The wireless communication apparatus of claim 24, wherein the impairment correlation estimator is further configured to determine the model fitting parameters based on the normalized modeled impairment correlation terms.

28. The wireless communication apparatus of claim 18, wherein the circuitry is further configured to filter the model fitting parameters to reduce estimation variance.

29. The wireless communication apparatus of claim 17, wherein the circuitry is configured to direct the impairment correlation estimator to determine the composite impairment correlation term based on the subset of modeled impairment correlation terms by directing the impairment correlation estimator to scale the modeled impairment correlation terms included in the subset by respective model fitting parameters and to combine the scaled modeled impairment correlation terms to form the composite impairment correlation term.

30. The wireless communication apparatus of claim 29, wherein the circuitry is configured to calculate the model fitting parameters based on the set of modeled impairment correlation terms.

31. The wireless communication apparatus of claim 30, wherein the circuitry is configured to re-calculate the model fitting parameters, before the impairment correlation estimator determines the composite impairment correlation term, based on the subset of modeled impairment correlation terms.

32. The wireless communication apparatus of claim 29, wherein the circuitry is configured to determine the model fitting parameters in accordance with a least-squares process.

33. The wireless communication apparatus of claim 17, further comprising a demodulator configured to demodulate the received signal.

34. The wireless communication apparatus of claim 33, wherein the demodulator is configured to demodulate the received signal by generating processing weights based on the composite impairment correlation term and demodulating the received signal based on the processing weights.

35. The wireless communication apparatus of claim 34, wherein the processing weights comprise one of GRAKE combining weights and chip equalizer filter tap weighs.

36. The wireless communication apparatus of claim 33, wherein the demodulator is further configured to generate a signal-to-interference estimate based on the composite impairment correlation term.

37. The wireless communication apparatus of claim 17, wherein the impairment correlation estimator is further configured to form the set of modeled impairment correlation terms by combining similar modeled impairment covariance terms into respective combined impairment covariance terms.

38. A base station including the wireless communication apparatus as claimed in claim 17.

39. A mobile device including the wireless communication apparatus as claimed in claim 17.

40. In a wireless communication device, a method of demodulating a received signal, comprising:
    forming a set of modeled impairment correlation terms corresponding to interference sources associated with the received signal;
    selecting a subset of the modeled impairment correlation terms by selecting the modeled impairment correlation terms having N largest model fitting parameters, wherein N is a predetermined positive integer;
    determining a composite impairment correlation term based on the subset of modeled impairment correlation terms; and
    demodulating the received signal based on the composite impairment correlation term.

* * * * *

UNITED STATES PATENT AND TRADEMARK OFFICE
CERTIFICATE OF CORRECTION

PATENT NO. : 7,751,511 B2
APPLICATION NO. : 11/550901
DATED : July 6, 2010
INVENTOR(S) : Reial et al.

It is certified that error appears in the above-identified patent and that said Letters Patent is hereby corrected as shown below:

Title page, item (75), "Inventors", in Column 1, Line 2 delete "Stafaanstorp" and insert -- Staffanstorp -- therefor.

In Column 1, Line 42 delete "preceding" and insert -- precoding -- therefor.

In Column 8, Line 39 in Equation (8), delete " $\hat{R}_n$ " and insert -- $\tilde{R}_n$ -- therefor.

Signed and Sealed this
Twenty-eighth Day of December, 2010

David J. Kappos
*Director of the United States Patent and Trademark Office*